United States Patent
Suginohara et al.

(10) Patent No.: US 8,306,392 B2
(45) Date of Patent: Nov. 6, 2012

(54) AUDIO-VIDEO RECORDING DEVICE

(75) Inventors: Hidetsugu Suginohara, Tokyo (JP); Isao Otsuka, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 293 days.

(21) Appl. No.: 12/738,452

(22) PCT Filed: Oct. 8, 2008

(86) PCT No.: PCT/JP2008/068269
§ 371 (c)(1),
(2), (4) Date: Apr. 16, 2010

(87) PCT Pub. No.: WO2009/051044
PCT Pub. Date: Apr. 23, 2009

(65) Prior Publication Data
US 2010/0215346 A1    Aug. 26, 2010

(30) Foreign Application Priority Data
Oct. 19, 2007    (JP) .................. 2007-272566

(51) Int. Cl.
*H04N 9/80* (2006.01)
(52) U.S. Cl. ................. 386/249; 386/248
(58) Field of Classification Search .......... 386/248–252
See application file for complete search history.

(56) References Cited

U.S. PATENT DOCUMENTS

| | | | |
|---|---|---|---|
| 5,696,866 A | 12/1997 | Iggulden et al. | |
| 5,987,210 A | 11/1999 | Iggulden et al. | |
| 6,449,021 B1 | 9/2002 | Ohta et al. | |
| 2007/0078715 A1* | 4/2007 | Murakami | 705/14 |
| 2007/0150919 A1* | 6/2007 | Morishita | 725/35 |
| 2007/0230905 A1* | 10/2007 | Kato et al. | 386/94 |
| 2008/0263581 A1* | 10/2008 | Turner | 725/22 |
| 2011/0145855 A1* | 6/2011 | Muramatsu et al. | 725/32 |

FOREIGN PATENT DOCUMENTS

| | | |
|---|---|---|
| EP | 1150446 A2 | 10/2001 |
| JP | 8-507633 A | 8/1996 |
| JP | 2000-165796 A | 6/2000 |
| JP | 2003-47031 A | 2/2003 |
| JP | 2007-49380 A | 2/2007 |
| WO | WO 94/16442 A1 | 7/1994 |

OTHER PUBLICATIONS

Extended European Search Report for corresponding Application No. EP 08839375.6, dated Jan. 25, 2011.

* cited by examiner

*Primary Examiner* — Thai Tran
*Assistant Examiner* — Nigar Chowdhury
(74) *Attorney, Agent, or Firm* — Birch, Stewart, Kolasch & Birch, LLP (57) ABSTRACT

Problem: It is to automatically recognize CM-broadcast periods, while video-recording television broadcast, without interfering with simultaneous access action to the medium for video-recording the television broadcast.
Means to Solve the Problem: By detecting transition points in an audio video signal of a television broadcast, recognizing a CM broadcast period when the points occur at intervals specific to CM-broadcast periods, and controlling to record into a recording medium at a predetermined timing, time information of plural CM-broadcast periods determined to be continuous, the frequency to access the recording medium can be reduced, which results in simultaneously recording inputted video images and time information of CM-broadcast periods into the recording medium.

6 Claims, 6 Drawing Sheets

AUDIO-VIDEO RECORDING DEVICE

TECHNICAL FIELD

This invention relates to an audio-video recording device that records coded-compressed images and sounds into a DVD recordable disc including a DVD-R, a DVD-RW or the like, or a recording medium, such as a hard disk drive, Blueray Disc or a flash memory.

BACKGROUND ART

It is possible that television broadcast is roughly classified, according to its contents, into "main program broadcast" or "commercial messages broadcast". The main program broadcast is, if it is a movie program, audio-video data of the movie's contents itself. On the other hand, the commercial messages broadcast is audio-video data that is provided by clients, such as a sponsor and an advertising agency making a contract with a broadcaster, to be broadcast during breaks of the main program broadcast. A broadcaster may sometimes perform its own advertisement. Commercial Messages are generally abbreviated as "CM", which will be thus used in this document. In many cases, content of the main program broadcast less relates with that of the CM broadcast, thus there has been a demand that only the main program broadcast in a video-recorded television broadcast be continuously watched, while skipping CM broadcast. On the other hand, many of recent CM broadcasts fully use the latest imaging technique, or have a high artistic quality or a high originality, which leads to another demand that only CMs be watched. In order to serve the demands, a technique is necessary that automatically distinguishes the CM broadcasts from the main program broadcasts with high accuracy.

In order to distinguish the CM broadcast in a television broadcast, there has been a technique that detects, for example, an audio format in television broadcast to thereby automatically distinguish the CM broadcast from the main program broadcast. The technique determines a stereophonic-sound detected period as a CM broadcast period, using a feature that a monaural sound or a binaural sound (Japanese and English in foreign movies or the like) is typically used for the main program broadcast as its audio format, while stereophonic sound is typically used for the CM broadcast.

There has been another technique in which a CM-broadcast period is found out by detecting an frame image with the whole image being black, named as "a black frame", that is inserted at a boundary between the main program broadcast and the CM broadcast (for example, refer to Patent document 1). There has also been another technique in which a silence period occurring at a boundary between the main program broadcast and the CM broadcast is detected so that a CM-broadcast period is found out on the basis of intervals of silence periods occurring (for example, refer to Patent document 2).

[Patent document 1] U.S. Pat. No. 5,696,866, Japanese Unexamined Patent Application Publication (Translation of PCT Application) No. H08-507633 (page 12-15, FIG. 1)

[Patent document 2] Japanese Unexamined Patent Application Publication No. 2003-47031 (Page 5-8, FIG. 1)

According to the CM-broadcast periods thus recognized by these techniques, the recorded television broadcast can be played back with the CM-broadcast periods being skipped, by referring time information, for example, of the CM-broadcast periods that has been stored into a recording medium.

These techniques distinguishing a CM broadcast from a television broadcast make use of various kinds of transition points in images and/or sounds in television broadcast to automatically recognize a CM broadcast. However, transition points of the previously-mentioned "black frames" or the silence periods may occur even during the main program broadcast other than CM broadcasts, and, depending on stage effects in the program, the transition points may frequently occur.

DISCLOSURE OF THE INVENTION

Problems to be Solved by the Invention

The subject of the present invention for solving the problem is how to record CM-broadcast period information obtained by automatically recognizing CM broadcasts from transition-points in images and sounds of a television broadcast.

In the case where CM-broadcast periods are automatically recognized while television broadcast is being video-recorded, at every instant when a CM broadcast is automatically detected from transition points of images and/or sounds, the CM-broadcast period information can be stored into the same medium that the television broadcast is recorded. However, a problem is that when transition points representing CM-broadcast periods occur in succession and then a lot of CM-broadcast period information is to be stored into the recording medium, a bus load for accessing the recording medium is increased, so that the television broadcast may be prevented from being video-recorded, leading to a system control failure.

Means for Solving the Problem

This invention is made to solve the problem described above. According to an aspect of the present invention, an audio-video recording device that records a video signal and an audio signal of television broadcast into a recording medium includes a transition-point detecting unit that detects, from the video signal or the audio signal of the television broadcast, its transition points;

a CM-broadcast-period detecting unit that detects transition points that occur corresponding, with a predetermined tolerance, to a time interval specific to a CM broadcast, to thereby recognize a period defined by the thus detected transition points as a CM-broadcast period;

a CM-broadcast-period-continuity determining unit that determines whether or not the CM-broadcast period detected by the CM-broadcast detecting unit is continuous with one previously detected;

a CM-broadcast-period-information-recording controlling unit that includes a record allowability flag indicating whether or not recording to the recording medium is allowable, that controls to record into the recording medium at a predetermined timing, when the flag indicates a record-allowable state, time information representing CM-broadcast periods determined, among those detected by the CM-broadcast-period detecting unit, to be continuous by the CM-broadcast-period-continuity determining unit, and that makes the flag indicate a unallowable state for a predetermined time after recording to the recording medium;

a CM-broadcast-period-information selecting and unifying unit that selects plural information of the CM-broadcast-periods from among those stored in the CM-broadcast-period-information -recording controlling unit, and unifies the plural information to provide information of another CM-broadcast-period to be recorded; and an information recording unit that records into the recording medium, the time information representing the another CM-broadcast period outputted from the CM-broadcast-period-information -recording controlling unit.

Effects of the Invention

The present invention brings an effect that, by decreasing frequency of recording CM-broadcast-period information and regulating a bus load, CM-broadcast-period information detected during the video-recording of television broadcast can simultaneously be recorded with no interference in the video-recording of television broadcast, and by selecting and unifying CM-broadcast-period information to be recorded, more information can be recorded into a recording medium having a limited capacity. Moreover, even when playing back an already-video-recorded portion of a television broadcast while it is being video-recorded—so called "chasing playback", CM-broadcast periods can be skipped.

| [Reference numerals] | |
|---|---|
| 1 | signal |
| 2 | recording medium |
| 3 | transition-point detecting unit |
| 4 | CM-broadcast-period detecting unit |
| 5 | CM-broadcast-period-continuity determining unit |
| 6 | CM-broadcast-period-information-recording controlling unit |
| 7 | CM-broadcast-period-time-information selecting and unifying unit |
| 8 | writing buffer |
| 31, 32, 33, 34 | transition point |
| 40 | audio-video signal |
| 41, 42 | CM-broadcast period |
| 501 through 502 | transition point |
| 60 | video signal |
| 601 through 609 | CM-broadcast period |
| 701 through 705 | CM-broadcast period |
| 100 | audio-video recording device |
| 200, 400 | flow chart |

| [Reference numerals] | |
|---|---|
| 80 | video-record end time |
| 81 | presumed-CM-broadcast period |

BEST MODE FOR CARRYING OUT THE INVENTION

Embodiment 1

Figure 1:
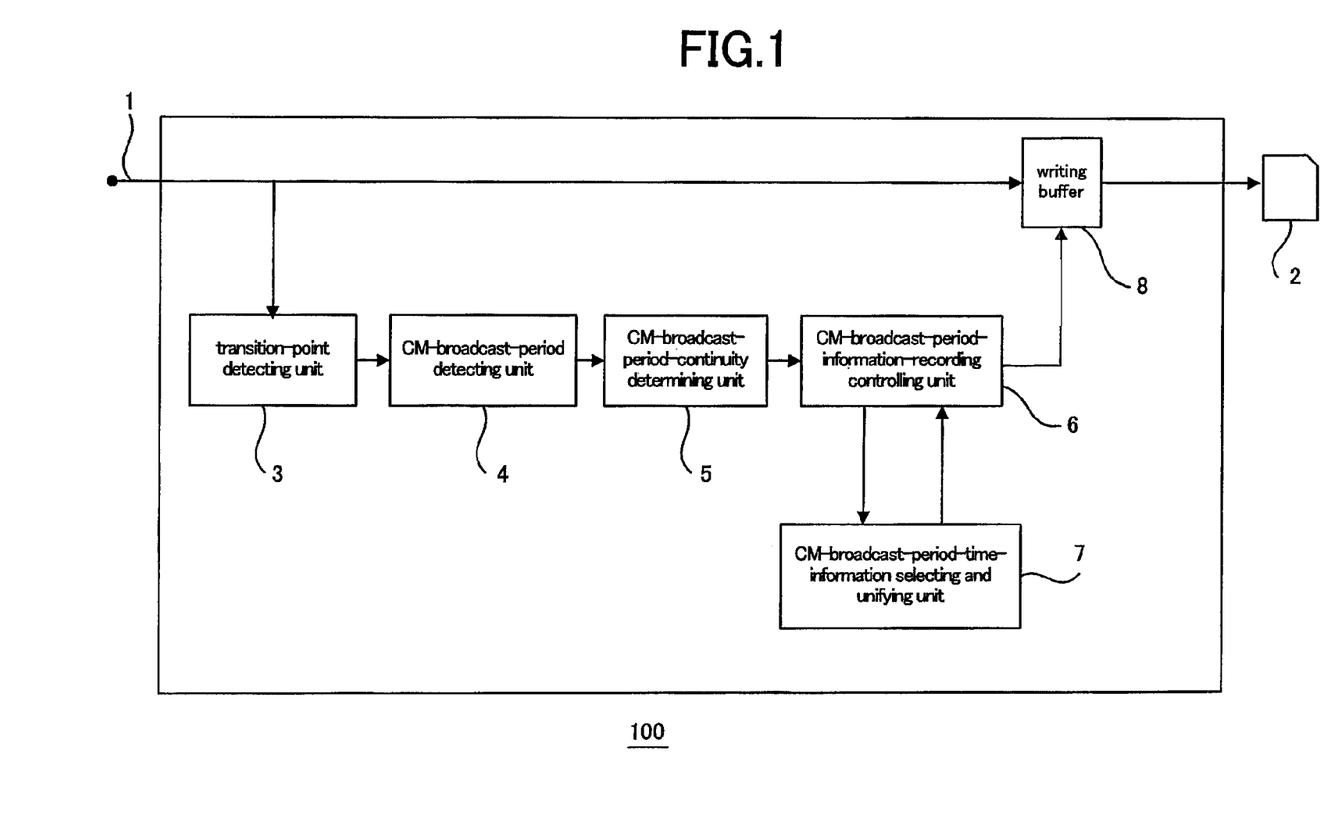
FIG. 1 is a system block diagram of Embodiment 1 according to the present invention.

FIG. 1 is a system block diagram for an audio-video recording device of Embodiment 1 according to the present invention. In FIG. 1, numeral 100 represents the audio-video recording device of Embodiment 1, and components of the audio-video recording device 100 will be explained.

Numeral 1 represents a television broadcast signal or the like including images and sounds;

numeral 2 represents a recording medium, such as a flash memory, into which a television broadcast is recorded and stored in a coded and compressed form;

numeral 3 represents a transition-point detecting unit for detecting transition points in a video signal or an audio signal of television broadcast or the like;

numeral 4 represents a CM-broadcast-period detecting unit that detects from transition points detected by the transition-point detecting unit 3, those occurring at a time interval specific to CM broadcasts;

numeral 5 represents a CM-broadcast-period-continuity determining unit that determines whether or not the CM-broadcast period detected by the CM-broadcast-period detecting unit 4 succeeds to one previously detected;

numeral 6 represents a CM-broadcast-period-information-recording controlling unit that controls to record into the recording medium at a predetermined timing, time information representing a CM-broadcast period which is among those detected by the CM-broadcast-period detecting unit 4 and which is determined to be continuous by the CM-broadcast-period-continuity determining unit 5; and numeral 7 represents a CM-broadcast-period-information selecting and unifying unit that unifies plural CM-broadcast-period information stored in the CM-broadcast-period-information -recording controlling unit 6, into information of another CM broadcast period to be recorded.

Video-recording actions of the audio-video recording device 100 will be explained, using FIG. 1. Audience generally video-records television broadcast for their private use, using a DVD video recorder, a hard-disk video recorder or the like. When a coded-compressed audio-video signal such as digital broadcast is recorded, a received signal 1 including images and sounds is directly recorded into the recording medium 2. Here, the signal 1 that includes coded-compressed images and sounds may be recorded after being transcoded or subjected to further compression or the like. Input signals to be video-recorded are audio video signals obtained by receiving analog broadcast, and analog signals from external input terminals of an audio-video playback device such as a video deck or a DVD player, a satellite broadcast receiver or the like. When the input signal is an analog signal, its audio video signal is processed by such as an MPEG encoder so as to be coded-compressed and then recorded. Audio-video data to be recorded include time information data, such as a PTS (presentation time stamp), for controlling playback time. By using this time information to playback, images and sounds can be played back synchronously. Data to be recorded into the recording medium 2 are once stored in a writing buffer 8 and then, sequentially recorded and stored in a predetermined area of the recording medium. In the present invention, a series of these processes is called a "video-recording" (or a "video-recording operation").

Next, how the transition-point detecting unit 3 operates will be explained. The signal 1 including images and sounds—objects to be video-recorded—is inputted into the transition-point detecting unit 3. The transition-point detecting unit 3 analyzes the inputted video signal and audio signal to thereby detect transition-points for determining CM-broadcast periods. Transition points for determining CM-broadcast periods are, for example, scene-change-occurring periods and silence periods. In most television broadcast cases, the main program broadcast does not relate to its CM broadcast in their contents, thus their images change at their boundaries, which frequently cause scene changes. Scene changes also occur similarly between CM broadcasts. Furthermore, it is almost common that a silence period is generally inserted before and after CM broadcast.

Here, how to detect a silence period will be explained. When PCM audio data are inputted as an audio signal, the amplitudes of respective data values represent the loudness of their sounds. Thus, a sound level can be obtained by dividing PCM audio data on a certain time unit and summing up the PCM audio data's amplitude values on that unit. Because the length of the silence period before and after CM broadcast is about several hundred milliseconds, PCM audio data's amplitude values are summed at every time division (for example, 30 ms) that enables detection of the silence period, so that a period with summation values smaller than a threshold value is to be detected as the silence period.

When a coded-compressed audio signal is inputted, PCM audio data can be obtained by processing the audio signal with the corresponding decoder. In addition, using other methods except the one described above, a silence period may be detected in a manner that an audio signal is transformed into the frequency domain through the fast Fourier transform (FFT) to calculate energy of the signal and then a period with its energy smaller than a threshold value is detected as the silence period.

Moreover, a transition point detected by the detecting unit 3 may not be a single transition point, such as a scene change or a silence period, but may be a period during which a scene change and a silence period occur at the same time.

Scene changes and silence periods can frequently occur in the main program broadcast. Therefore, by using as a transition point, a period during which a scene change and a silence period occur at the same time, the accuracy of automatic detection for a CM-broadcast period can be improved. Occurrence time information of a transition point detected by the transition-point detecting unit 3 is sent to a CM-broadcast-period detecting unit 4. For example, if a silence period occurs, the start time and the end time of the period are its occurrence time information. Time information can be obtained, using PTS or the like corresponding to the recorded audio video signal.

Next, how the CM-broadcast-period detecting unit 4 operates will be explained. The CM-broadcast-period detecting unit 4 stores occurrence time information about each transition point detected by the transition-point detecting unit 3, and detects CM-broadcast periods by finding out such transition points that occur with a periodicity that is specific to a CM broadcast.

Figure 2:
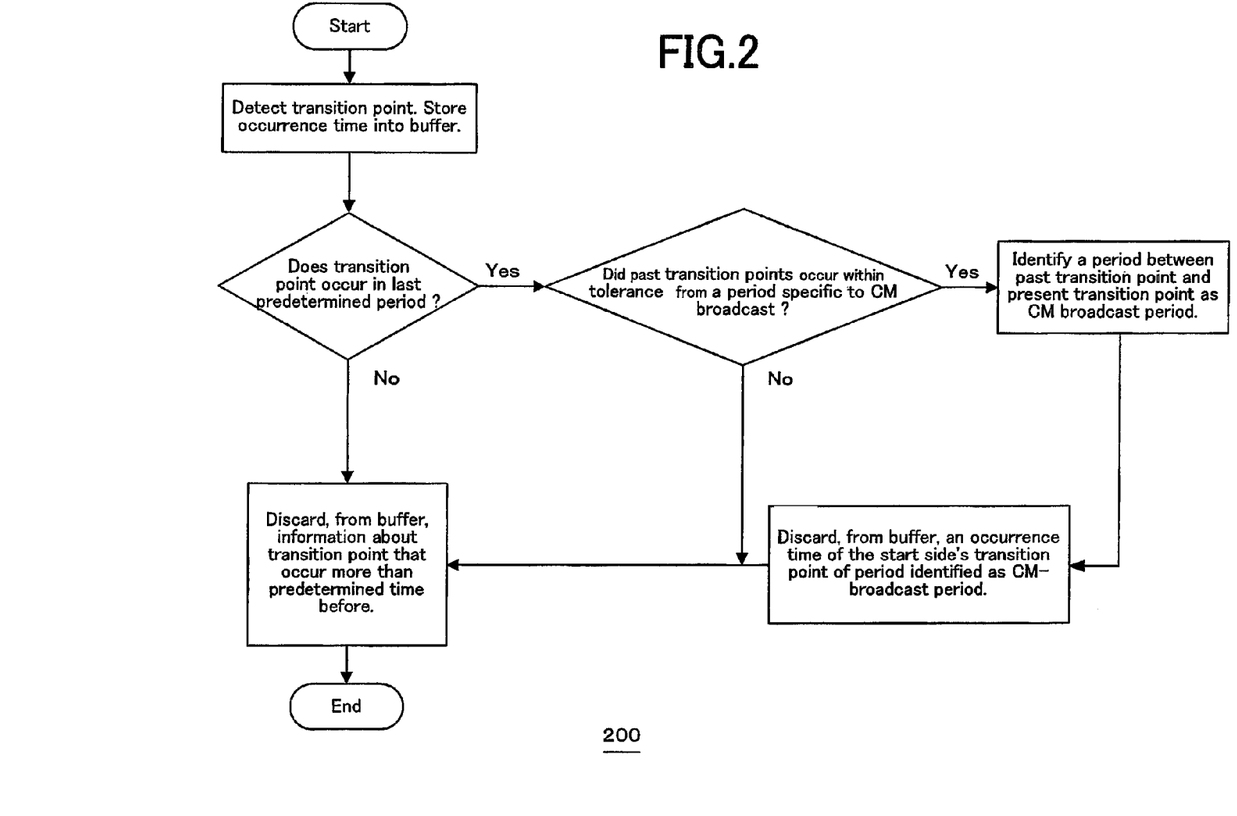
FIG. 2 is a flow chart explaining procedures of a CM-broadcast-period detecting unit of Embodiment 1 according to the present invention.
Figure 3:
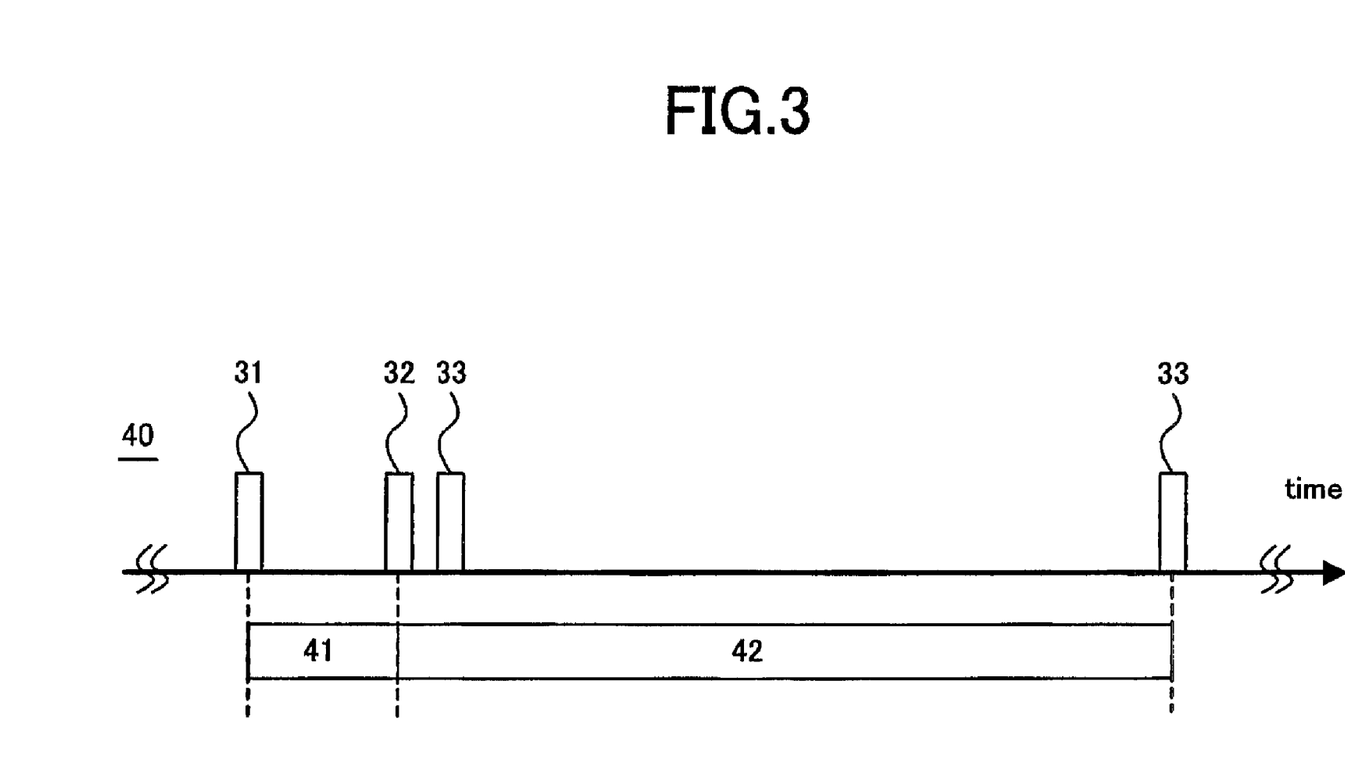
FIG. 3 shows transition points in an audio-video signal and CM-broadcast periods to be detected in Embodiment 1 of the present invention.

FIG. 2 is a flow chart 200 that explains operations of the CM-broadcast-period detecting unit 4. An explanation will be made, for example, for a case where an audio video signal 40 having transition points shown in FIG. 3 is subjected to the video-recording. Here, transition points 31, 32, 33, and 34 shown in FIG. 3 are silence periods, whose occurrence time are listed in Table 1. It is noted that the transition point may alternatively be determined as a portion during which a silence period and a scene change occur at the same time.

TABLE 1

| Silence period | Start time of Silence period (ms) | End time of Silence period (ms) |
|---|---|---|
| 31 | 99780 | 100500 |
| 32 | 114830 | 115350 |
| 33 | 119030 | 120010 |
| 34 | 179540 | 180332 |

When video-recording an audio video signal 40 shown in FIG. 3, the transition point 31 is detected at a time of 100500 ms, whose occurrence time information is stored in a buffer of the CM-broadcast-period detecting unit 4. At this moment, no transition point is previously detected, thus the CM-broadcast-period detecting unit 4 stops to operate.

When carrying on its video-recording, the transition point 32 is detected at a time of 115350 ms which is stored similarly in the buffer of the CM-broadcast-period detecting unit 4. The CM-broadcast-period detecting unit 4 firstly determines, for the transition point whose occurrence time has previously been detected and stored in the buffer, whether or not the occurrence time is within a predetermined time range from the present time. The predetermined time corresponds to the longest period to be detected as CM-broadcast period. For example, when a CM-broadcast period up to a maximum of 60 seconds is to be detected, it is necessary that a transition point exists within the past 60 seconds from the present time, and if a transition point exists beyond the past 60 seconds, it is not a candidate for the CM-broadcast period. Thus, a transition point whose occurrence time becomes beyond the past 60 seconds is discarded at this time point from the buffer of the CM-broadcast-period detecting unit 4.

Next, it is determined, for any of transition points whose occurrence times have previously been detected within the past 60 seconds and then stored in the buffer of the CM-broadcast-period detecting unit 4, whether or not the present transition point occurs within a tolerance from a specific period to a CM broadcast. Here, the specific period to a CM broadcast is 15 seconds, 30 seconds, 60 seconds, or the like. The tolerance is in the order of several hundred milliseconds—for example 200 milliseconds. Because it is recognized that the present transition point 32 occurs from the transition point 31, within the tolerance from a specific period (15 seconds) to a CM, the period between the transition point 31 and the transition point 32 is identified as a CM-broadcast period 41. Then, occurrence time information of the transition points 31 and 32 corresponding to a start point and an end point of the period, respectively, is sent to a CM-broadcast-period-continuity determining unit 5. Note that occurrence time information of the starting side of the period identified as the CM-broadcast period—that is, occurrence time information of the transition point 31—is discarded from the buffer of the CM-broadcast-period detecting unit 4.

Next, with progress of the video-recording, a transition point 33 is detected at a time of 120010 ms which is stored in the buffer of the CM-broadcast-period detecting unit 4. Because it is not recognized that the transition point 33 occurs, from the transition point 32 previously detected and stored in the buffer of the CM-broadcast-period detecting unit 4, within the tolerance from the period specific to a CM broadcast, the point is not identified as that for a CM-broadcast period and the processing for the transition point 33 ends.

With further progress of the video-recording, a transition point 34 is detected at a time of 180332 ms. Because it is recognized that the transition point 34 occurs, from the transition point 32, within the tolerance range from a period specific (60 seconds) to a CM, the period between the transition point 32 and the transition point 34 is identified as a CM-broadcast period 42. Then, occurrence time information of the transition points 32 and 34 corresponding to a start point and an end point of the period, respectively, is sent to the CM-broadcast-period-continuity determining unit 5. Note that occurrence time information of the starting side point of the period identified as the CM-broadcast period 42—that is, occurrence time information of the transition point 32—is discarded from the buffer. Furthermore, because the transition point 32 occurs previously more than 60 seconds from when the transition point 34 is detected, occurrence time information of the transition point 32 is discarded from the buffer.

As described above, appropriately discarding occurrence time information about transition points stored in the buffer can reduce memory usage and prevent CM-broadcast periods from being redundantly detected for a series of CM-broadcast periods. When a period is identified as a CM-broadcast period, occurrence time information about transition points corresponding to a start and end points of the period is sent to the CM-broadcast-period-continuity determining unit 5.

Next, explanation will be made about operations of the CM-broadcast-period-continuity determining unit 5. The CM-broadcast-period-continuity determining unit 5 determines whether or not CM-broadcast periods, for example, of 15 seconds, seconds, or 60 seconds, that are detected by the CM-broadcast-period detecting unit 4, are continuous to each other.

For example, when the audio video signal including transition points shown in FIG. 3 is recorded, the CM-broadcast period 41 that includes the transition point 31 as its start point and the transition point 32 as its endpoint is detected at the time of 115350 ms, and then the information is inputted into the CM-broadcast-period-continuity determining unit 5. Next, at the time of 180332 ms, information of the CM-broadcast period 42 that includes the transition point 32 as its start point and the transition point 34 as its endpoint is inputted into the CM-broadcast-period-continuity determining unit 5. If an end point of one of the CM-broadcast periods coincides with a start point of the other one, the CM-broadcast-period-continuity determining unit 5 considers that both CM-broadcast periods are continuous. That is, because the end point of the CM-broadcast period 41 is the transition point 32 and the start point of the CM-broadcast period 42 is also the transition point 32, it is determined that these CM-broadcast periods are continuous.

Only the CM-broadcast periods recognized as being continuous by the CM-broadcast-period-continuity determining unit 5, are sent to a CM-broadcast-period-information-recording controlling unit 6 and become candidates to be recorded and stored into the recording medium 2 as CM-broadcast periods. This eliminates the non-continuous period from being recorded and stored as CM-broadcast-period information, to enhance accuracy in detecting CM-broadcast periods, because in typical television broadcasts, mostly, plural CM broadcasts of 15 seconds, 30 seconds, or 60 seconds or the like are continuously broadcasted, thus the period that is recognized as CM-broadcast period but is not continuous, is likely to be that of a main program broadcast mistook for a CM-broadcast period.

Next, explanation will be made about operations of the CM-broadcast-period-infoimation -recording controlling unit 6. The CM-broadcast-period-information-recording controlling unit 6 receives information about the CM-broadcast period recognized as being continuous by the CM-broadcast-period-continuity determining unit 5, and records and stores the CM-broadcast period time information into the recording medium 2, while controlling timing so that the whole processing in the system is load-balanced. Furthermore, CM-period-time information recorded and stored into the recording medium 2 is that which has been selected and unified by a CM-broadcast-period-time-information selecting and unifying unit 7.

Figure 4:
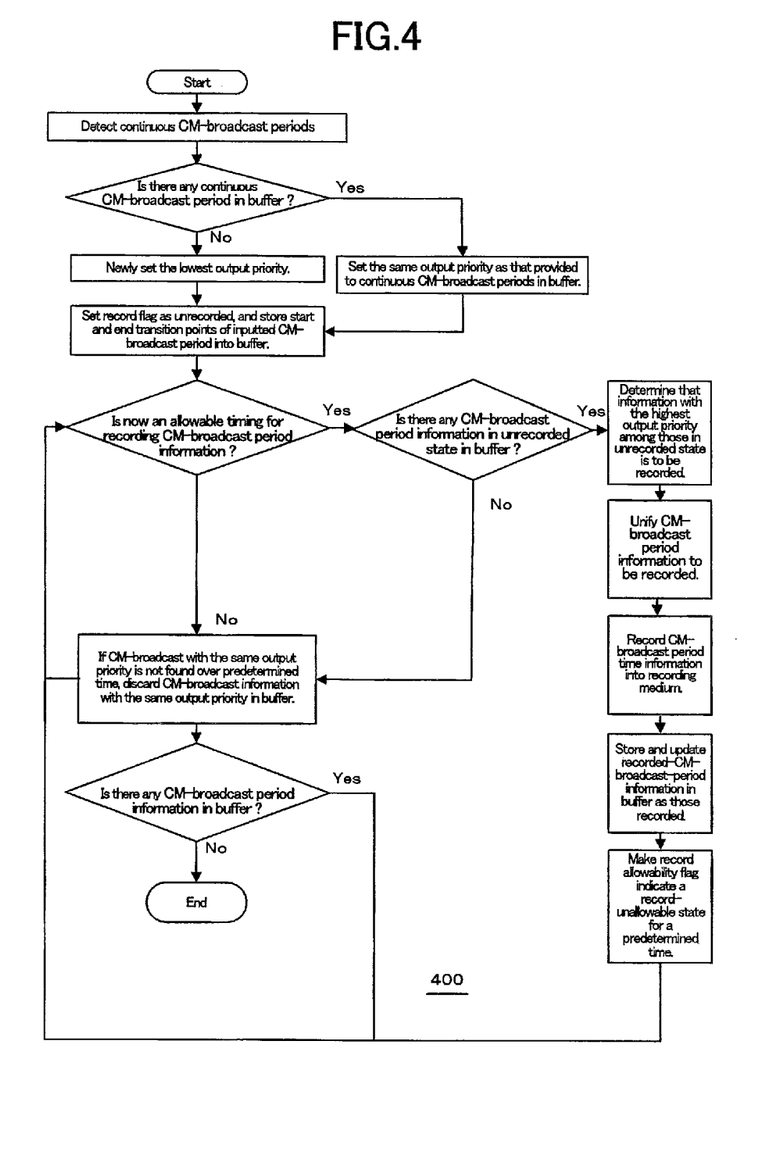
FIG. 4 is a flow chart explaining procedures of the CM-broadcast-period-information-recording controlling unit and the CM-broadcast-period-time-information selecting and unifying unit of Embodiment 1 according to the present invention.

FIG. 4 is a flow chart 400 that explains operations of the CM-broadcast-period-information-recording controlling unit 6 and the CM-broadcast-period-information selecting and unifying unit 7. Explanation for their operations will be made for an example where an audio video signal 60 having transition points 501 through 512 shown in FIG. 5 and Table. 2 is to be video-recorded.

TABLE 2

Figure 5:
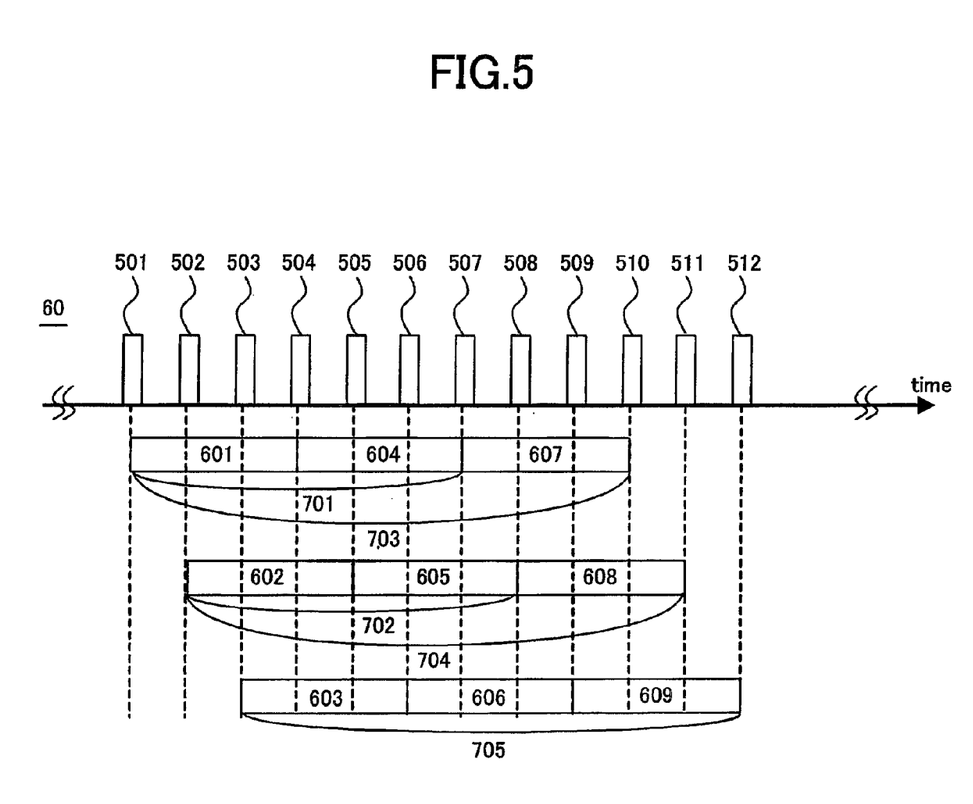
FIG. 5 shows transition points in an audio-video signal and CM-broadcast periods to be detected in Embodiment 1 of the present invention.

| transition point | detected time (ms) |
|---|---|
| 501 | 300000 |
| 502 | 305000 |
| 503 | 310000 |
| 504 | 315000 |
| 505 | 320000 |
| 506 | 325000 |
| 507 | 330000 |
| 508 | 335000 |
| 509 | 340000 |
| 510 | 345000 |
| 511 | 350000 |
| 512 | 355000 |

When an audio video signal shown in FIG. 5 is subjected to the video-recording, continuous CM-broadcast periods are detected at a time of 330000 ms according to the previously described processes performed by the transition point detecting unit 3, the CM-broadcast-period detecting unit 4, and the CM-broadcast-period-continuity determining unit 5. The continuous periods are a CM-broadcast period 601 having the transition point 501 as its start point and the transition point 504 as its endpoint and a CM-broadcast period 604 having the transition point 504 as its start point and the transition point 507 as its end point are inputted into the CM-broadcast-period-information-recording controlling unit 6.

The CM-broadcast-period-information-recording controlling unit 6 stores into the writing buffer 8, time information of the start transition point and end transition point for each of the CM-broadcast period 601 and the CM-broadcast period 604, which are inputted at the time of 330000 ms.

When buffering information of CM-broadcast-periods, an output priority is set to each of the information in accordance with their inputted order to the writing buffer 8. At this moment, the same output priorities are set for the CM-broadcast periods continuous to each other. When recording CM-broadcast-period information in the buffer into the recording medium 2, a higher recording priority is given to such information that has a higher output priority and has not yet been recorded in the medium. Because the CM-broadcast period 601 and the CM-broadcast period 604 are new CM-broadcast-period information to the buffer, their output priorities are set, for example, as 1000.

When buffering information of CM-broadcast-periods, a record flag is also set for each of the information to indicate whether or not the each of the information has been recorded. Because the CM-broadcast period 601 and the CM-broadcast period 604 have not been recorded, their record flags are set as unrecorded state.

Next, it is determined by way of a record allowability flag whether the present timing is an allowable timing for recording CM-broadcast period time information into the recording medium 2. When determined allowable to record CM-broadcast period time information, the CM-broadcast-period information that is in unrecorded state and at the highest output priority, is selected among data being buffered out of CM-broadcast-period information in the CM-broadcast-period-information-recording controlling unit 6. At a time of 330000 ms, data that are buffered and in unrecorded state are those of two periods having the same output priority of 1000—a CM-broadcast period 601 having the transition point 501 as its start point and the transition point 504 as its end point and a CM-broadcast period 604 having the transition point 504 as its start point and the transition point 507 as its end point, and those data are to be recorded.

The CM-broadcast-period information to be recorded are selected and unified into other CM-broadcast-period-time information that should be recorded by a CM-broadcast-period-time-information selecting unifying unit 7. At this moment, the two CM-broadcast periods have not been recorded, thus they are joined into a single CM-broadcast period 701 having the transition point 501 as its start point and the transition point 507 as its end point, so that an occurrence start time of the transition point 501 and an occurrence end time of the transition point 507 are recorded as CM-broadcast period time information into the recording medium 2.

The information about the CM-broadcast period 701, that has been joined into a single one to have the transition point 501 as its start point and the transition point 507 as its end point, is assigned to the same output priority, 1000, as that before being joined, with its record flag set as recorded state, and then buffered again in the writing buffer 8 in a manner of overwriting the information of the CM-broadcast period 601 and the CM-broadcast period 604.

After recording CM-broadcast period time information, the record allowability flag is set during a predetermined period as record-unallowable state, thereby preventing CM-broadcast period time information from being frequently recorded. Here, for an example, during 14 seconds after CM-broadcast period time information is recorded into the recording medium 2, next CM-broadcast period time information is not recorded. Controlling operation described above enables parallel recording of video and its CM-broadcast-period-time information, while controlling record timing such that even plural CM-broadcast periods are detected, the respective periods are not always recorded, and regulating the bus load by selecting and unifying CM-broadcast period time information to be recorded.

With progress of the video-recording, at a time of 335000 ms, next series of CM-broadcast periods—a CM-broadcast period 602 having a transition point 502 as its start point and a transition point 505 as its endpoint, and a CM-broadcast period 605 having the transition point 505 as its start point and a transition point 508 as its end point—are inputted into the CM-broadcast-period-information-recording controlling unit 6 and buffered.

When buffered, it is determined whether the CM-broadcast period currently buffered is continuous with any of CM-broadcast period information already buffered, and if determined it is continuous, its output priority is assigned to the same one as that of the period already buffered. If determined it is not continuous, its output priority is assigned to the lowest one among the CM-broadcast periods in the writing buffer 8. With respect to the CM-broadcast period 602 having the transition point 502 as its start point and the transition point 505 as its end point and the CM-broadcast period 605 having the transition point 505 as its start point and the transition point 508 as its end point, there is no continuous CM-broadcast-period information in the writing buffer 8, thus each of their output priorities is newly assigned to 1001 as the lowest output priority.

The CM-broadcast period 602 having the transition point 502 as its start point and the transition point 505 as its end-point and the CM-broadcast period 605 having the transition point 505 as its start point and the transition point 508 as its end point are not recorded into the recording medium 2, thus each of their record flags is set as unrecorded one.

Because at a time of 335000 ms, 14 seconds has not passed after time information of the CM-broadcast period 701 was recorded at the time of 330000 ms into the recording medium 2, the record allowability flag is still set as record-unallowable state; thus, at the time of 335000 ms, information of CM-broadcast periods 602 and 605 is deferred from being recorded.

With progress of the video-recording, at a time of 340000 ms, next series of CM-broadcast periods—a CM-broadcast period 603 having a transition point 503 as its start point and a transition point 506 as its endpoint and a CM-broadcast period 606 having the transition point 506 as its start point and a transition point 509 as its end point—are inputted into the CM-broadcast-period-information-recording controlling unit 6.

Although these periods are buffered, similarly to those described above, with respectively given output priorities 1002 and given information indicative of unrecorded state, those information are deferred from being recorded, because the record allowability flag is set as record-unallowable state.

Because at a time of 344000 ms, 14 seconds has passed after time information of the CM-broadcast period was outputted at the time of 330000 ms, the record allowability flag is changed from a record-unallowable state to a record-allowable state. When the record allowability flag is changed to the record-allowable state, if there is CM-broadcast-period information in unrecorded state in the writing buffer 8, the information is recorded into the recording medium 2 according to its output priority.

At a time of 344000 ms, in the writing buffer 8, there are CM-broadcast-period information in unrecorded state, of the CM-broadcast period 602 and the CM-broadcast period 605, both having output priority of 1001, and the CM-broadcast period 603 and the CM-broadcast period 606, both having output priority of 1002, thus two CM-broadcast periods having a higher output priority of 1001 are to be recorded.

CM-broadcast-period information to be recorded are selected and unified into CM-broadcast-period-time information that should be recorded, by the CM-broadcast-period-time-information selecting unifying unit 7. Both of the CM-broadcast period 602 and the CM-broadcast period 605 are in unrecorded state, thus they are joined into a single CM-broadcast period 702 having the transition point 502 as its start point and the transition point 508 as its end point, so that an occurrence start time of the transition point 502 and an occurrence end time of the transition point 508 are recorded as time information of the CM-broadcast period 702 into the recording medium 2. Information about the CM-broadcast period 602 and the CM-broadcast period 605 that are stored in the writing buffer 8 and have the output priority of 1001 are joined and updated into information of a single CM-broadcast period 702, and its record flag is set as recorded state. Furthermore, because the information about the CM-broadcast period 702 is recorded in the recording medium 2, the record allowability flag is again set for 14 seconds so as to indicate that recording is unallowable.

With further progress of the video-record, at a time of 345000 ms, a CM-broadcast period 607 that is continuous to the CM-broadcast period 604 and has a transition point 507 as its start point and a transition point 510 as its end point is inputted into the CM-broadcast-period-information-recording controlling unit 6. At the time of 345000 ms, the record allowability flag indicates a record-unallowable state, therefore, recording the information of the CM-broadcast period 607 is deferred, and the information is buffered only.

When buffering, because there is information of the CM-broadcast period 701 continuous to that of the CM-broadcast period 607 in the writing buffer 8, the output priority of the CM-broadcast period 607 is set as 1000—the same priority as that of the CM-broadcast period 701, and its record flag is set as unrecorded one.

Similarly, at a time of 350000 ms, a CM-broadcast period 608 which is continuous to the CM-broadcast period 605 and has the transition point 508 as its start point and a transition point 511 as its end point is inputted into the CM-broadcast-period-information-recording controlling unit 6. At the time of 350000 ms, the record allowability flag indicates a record-unallowable state, therefore, recording the information of the CM-broadcast period 608 is deferred, and the information is buffered only.

When buffering, because there is information of the CM-broadcast period 702 continuous to that of the CM-broadcast period 608 in the writing buffer 8, the output priority of the CM-broadcast period 608 is set as 1001—the same priority as that of the CM-broadcast period 702, and its record flag is set as unrecorded one.

At a time of 355000 ms, a CM-broadcast period 609 which is continuous to the CM-broadcast period 606 and has the transition point 509 as its start point and the transition point 511 as its end point is inputted into the CM-broadcast-period-information-recording controlling unit 6. At the time of 355000 ms, the record allowability flag indicates a record-unallowable state, therefore, recording the information of the CM-broadcast period 609 is deferred, and the information is buffered only.

When buffering, because there is information of the CM-broadcast period 606 continuous to that of the CM-broadcast period 609 in the writing buffer 8, the output priority of the CM-broadcast period 608 is set as 1002—the same priority as that of the CM-broadcast period 606, and its record flag is set as unrecorded one.

Because at a time of 358000 ms, 14 seconds has passed after time information of the CM-broadcast period 702 was outputted at the time of 344000 ms, the record allowability flag is changed from a record-unallowable state to a record-allowable state.

At a time of 358000 ms, in the writing buffer 8, there are CM-broadcast-period information in unrecorded state, of the CM-broadcast period 607 having output priority of 1000, the CM-broadcast period 608 having output priority of 1001, and the CM-broadcast periods 603, 606, and 609 having output priority of 1002, thus the CM-broadcast period 607 having the highest output priority of 1000 is to be recorded.

The CM-broadcast period 607 to be recorded is a single CM-broadcast period, thus the CM-broadcast-period-time-information selecting and unifying unit 7 selects, as CM-broadcast period time information to be recorded, the occurrence start time of the transition point 507 and the occurrence end time of the transition point 510 and records them into the recording medium 2 as time information of the CM broadcast period 607.

Information about the CM-broadcast period 701 and the CM-broadcast period 607 that are stored in the writing buffer 8 and have the output priority of 1000 has already been recorded, thus it is joined and updated into information of a single CM-broadcast period 703, and its record flag is set as recorded state. Furthermore, because the information about the CM-broadcast period 607 is recorded in the recording medium 2, the record allowability flag is again set for 14 seconds so as to indicate that recording is unallowable.

Because at a time of 372000 ms, 14 seconds has passed after time information of the CM-broadcast period 607 was outputted at the time of 358000 ms, the record allowability flag is changed from a record-unallowable state to a record-allowable state.

At a time of 372000 ms, in the writing buffer 8, there are CM-broadcast-period information in unrecorded state, of the CM-broadcast period 608 having output priority of 1001, the CM-broadcast periods 603, 606, and 609 having output priority of 1002, and the CM-broadcast periods 603, 606, and 609 having output priority of 1002, thus the CM-broadcast period 608 having the higher output priority of 1001 is to be recorded.

Similarly to recording the CM-broadcast period 607, the CM-broadcast period 608 to be recorded is a single CM-broadcast period, thus the CM-broadcast-period-time-information selecting and unifying unit 7 selects, as CM-broadcast period time information to be recorded, the occurrence start time of the transition point 508 and the occurrence end time of the transition point 511 and records them into the recording medium 2 as time information of the CM broadcast period 608.

Information about the CM-broadcast period 702 and the CM-broadcast period 608 that are stored in the writing buffer 8 and have the output priority of 1001, have already been recorded, thus they are joined and updated into information of a single CM-broadcast period 704, and its record flag is set as recorded state. Furthermore, because the information about the CM-broadcast period 608 is recorded in the recording medium 2, the record allowability flag is again set for 14 seconds so as to indicate that recording is unallowable. Because at a time of 386000 ms, 14 seconds has passed after time information of the CM-broadcast period 608 was outputted at the time of 372000 ms, the record allowability flag is changed from a record-unallowable state to a record-allowable state.

At a time of 386000 ms, in the writing buffer 8, there are CM-broadcast-period information in unrecorded state, of the CM-broadcast periods 603, 606, and 609 having output priority of 1002, and thus these periods are to be recorded.

CM-broadcast-period information to be recorded are selected and unified into CM-broadcast-period-time information that should be recorded, by the CM-broadcast-period-time-information selecting unifying unit 7. The CM-broadcast period 603, the CM-broadcast period 606 and the CM-broadcast period 609 are joined into a single CM-broadcast period 705 having the transition point 503 as its start point and the transition point 512 as its end point, so that an occurrence start time of the transition point 503 and an occurrence end time of the transition point 512 are recorded as time information of the CM-broadcast period 705 into the recording medium 2. Information about the CM-broadcast period 603, the CM-broadcast period 606 and the CM-broadcast period 609 that are stored in the writing buffer 8 and have the output priority of 1002, are joined and updated into information of a single CM-broadcast period 705, its record flag is set as recorded state. Furthermore, because the information about the CM-broadcast period 705 is recorded in the recording medium 2, the record allowability flag is again set for 14 seconds so as to indicate that recording is unallowable.

Because at a time of 400000 ms, 14 seconds has passed after time information of the CM-broadcast period 705 was outputted at the time of 386000 ms, the record allowability flag is changed from a record-unallowable state to a record-allowable state. But, at this moment, the writing buffer 8 does not contain CM-broadcast-period information whose state is unrecorded one, which suspends recording operations until a continuous CM-broadcast period is newly detected.

As described above, continuous CM-broadcast periods are controlled to have the same output priority in the writing buffer 8, and they are serially extended every time when a continuous CM-broadcast period is newly found out, and joined together every time when it is recorded.

If 60 seconds has passed since the latest continuous CM-broadcast period is found whose output priority equals a certain priority assigned to a CM-broadcast period in the writing buffer 8, it is determined that there is no more continuous CM-broadcast period, so that the CM-broadcast-period information having the certain output priority is discarded from the writing buffer 8.

As described above, by serially joining and unifying, or discarding the CM-broadcast-period information in the writing buffer 8, CM-broadcast periods can be detected and recorded with a small amount of memory while processing the video-recording, and by recording the joined and unified CM-broadcast-period information, the amount of information recorded and stored into the recording medium 2 can be reduced.

As described above, Embodiment 1 according to the present invention brings an effect that, by decreasing frequency of recording CM-broadcast-period information and regulating a bus load, CM-broadcast-period information detected during the video-recording of television broadcast can be recorded without interfering with, and simultaneously with recording television broadcast, and by selecting and unifying CM-broadcast-period information to be recorded, more information can be recorded into a recording medium having a limited capacity. Moreover, even when playing back an already-video-recorded portion of a television broadcast while it is being video-recorded—so called "chasing playback", CM-broadcast periods can be skipped.

Embodiment 2

Figure 6:
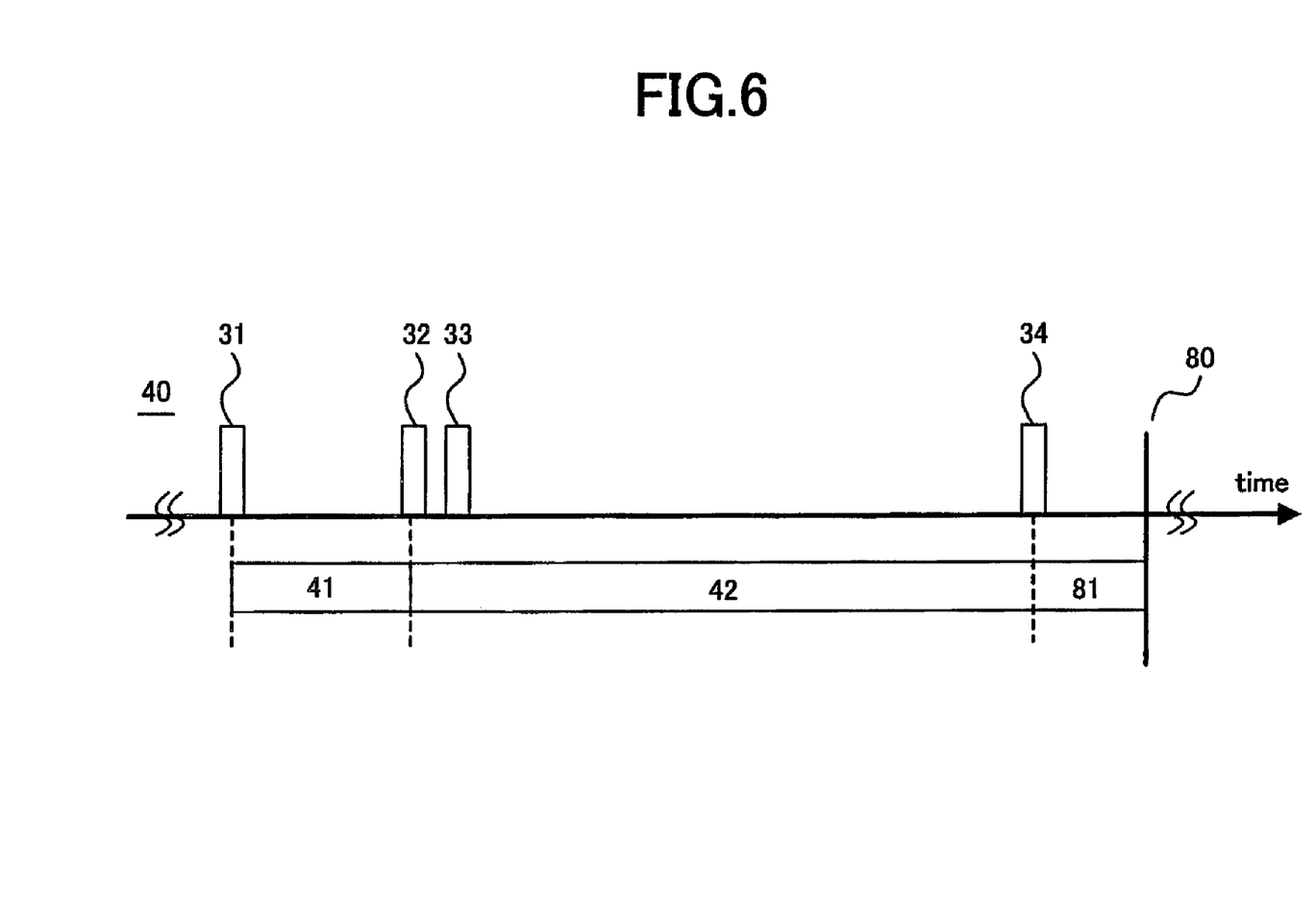
FIG. 6 shows transition points in an audio-video signal and CM-broadcast periods to be detected in Embodiment 2 of the present invention.

FIG. 6 is a view that shows transition points in an audio-video signal and CM-broadcast periods to be detected in Embodiment 2 of the present invention.

FIG. 6 shows a video-record-end time 80 and a presumed-CM-broadcast period 81. Some of the numeral references explained in Embodiment 1 are commonly used, thus explanations about those references will be omitted. When an audio video signal 40 shown in FIG. 6 is subjected to the video-recording, CM-broadcast periods 41 and 42 are identified by way of the transition points 31, 32, and 34 each recognized as those occurred within a range corresponding to a specific period plus its tolerance to a CM broadcast. The same explanations as described in Embodiment 1 are applied hereto, that the CM-broadcast-period-continuity determining unit 5 determines whether or not the CM-broadcast periods detected by the CM-broadcast-period detecting unit 4 are continuous, and therefore, in FIG. 6, the CM-broadcast periods 41 and 42 are determined to be continuous.

Here, a case will be explained as Embodiment 2 where the video-recording is ended at a time 80. It is determined whether the transition-point-occurrence time of the ending side of transition-points in the continuous CM broadcast periods, that is, the occurrence time of the transition point 34 which is the end point of the CM-broadcast period 42 in the example of FIG. 6, is within a predetermined time range from the end time 80.

The predetermined time range described above is set as, for example, 13 seconds which range is shorter than 15 seconds being the shortest range applied to CM broadcast, or, for example, 40 seconds which range is not long enough for audience to understand the content.

As a result of the above determination, if it is determined that the occurrence time of the transition point 34 being in the ending side of transition-points in the continuous CM broadcast periods is within a predetermined time range from the end time 80, the period 81 is determined as a presumed-CM-broadcast period and is joined to the continuous CM-broadcast periods, and then its operation is stopped Information of CM-broadcast period including the presumed-CM-broadcast period are sent to the CM-broadcast-period-information-recording controlling unit 6 by the CM-broadcast-period-continuity determining unit 5, and the information become candidates for CM-broadcast periods to be recorded and stored into the recording medium 2. Because a short period existing between the last CM-broadcast period in a video-recorded program and a video-record-end time is presumed to be a part of a CM-broadcast period, there brings an effect in that a CM broadcast that has been video-recorded as that terminated halfway of actual CM broadcast and thereby does not have a period—15 seconds, 30 seconds, or 60 seconds—specific to CM broadcasts, is prevented from being recognized as a part of the main program broadcast. Even if the period corresponds just to a part of the main program broadcast, since the period, which is too short, such as several ten seconds, for the audience to understand its contents, results in an unpleasant scene fragment, the period can be removed by presuming and processing it as a part of CM broadcast.

In addition, in Embodiment 2, if it is determined that the occurrence time of the transition point being in the ending side of transition-points in the continuous CM broadcast periods is within a predetermined time range from the record end time, a period between the occurrence time and the record end time is determined as a presumed-CM-broadcast period and is joined to the continuous CM-broadcast periods, and then is recorded and stored into the recording medium 2. However, the same effect can be obtained not by detecting a presumed-CM-broadcast period while video-recording, but by performing a playback control in which if a period between the last CM-broadcast period in a video-recorded program and the end of the video-recording is determined to be within a predetermined time range, the content corresponding to the period is not to be played back.

While, in Embodiment 2, an explanation is made for the operation relating to the end time of the video-recording, it can be similarly applied to the operation immediately after start time of the video-recording. If it is determined that occurrence time of a transition point being in the starting side of transition-points in continuous CM broadcast periods is within a predetermined time range from the record start time, a period between the occurrence time and the record start time is determined as a presumed-CM-broadcast period and is joined to the continuous CM-broadcast periods, and then is recorded and stored into the recording medium 2.

Because a short period existing between the first CM-broadcast period in a video-recorded program and a video-record-start time is presumed to be a part of a CM-broadcast period, there brings an effect in that a CM broadcast that has been video-recorded from the middle of actual CM broadcast and thereby does not have a period—15 seconds, 30 seconds, or 60 seconds—specific to CM broadcasts, is prevented from being recognized as apart of the main program broadcast. Even if the period corresponds just to a part of the main program broadcast, since the period, which is too short, such as several ten seconds, for the audience to understand its contents, results in an unpleasant scene fragment, the period can be removed by presuming and processing it as a part of CM broadcast.

Furthermore, the same effect can be obtained by performing a playback control in which if a period between the first CM-broadcast period in a video-recorded program and the start of the video-recording is determined to be within a predetermined time range, the content corresponding to the period is not to be played back.

Although, in Embodiment 2, it is explained that the determination of the presumed-CM-broadcast period is processed in the CM-broadcast-period-continuity determining unit 5, the determination may be processed in any operation block of the CM-broadcast-period detecting unit 4, the CM-broadcast-period-information-recording controlling unit 6, or the CM-broadcast-period-time-information selecting and unifying unit 7, so far as the similar function can be implemented therein.

What is claimed is:

1. An audio-video recording device that records a video signal and an audio signal of television broadcast into a recording medium, comprising:
    a transition-point detecting unit that detects, from the video signal or the audio signal of the television broadcast, its transition points;
    a CM-broadcast-period detecting unit that detects transition points that occur corresponding, with a predetermined tolerance, to a time interval specific to a CM broadcast, to thereby recognize a period defined by the thus detected transition points as a CM-broadcast period;
    a CM-broadcast-period-continuity determining unit that determines whether or not the CM-broadcast period detected by the CM-broadcast detecting unit is continuous with one previously detected;
    a CM-broadcast-period-information-recording controlling unit that includes a record allowability flag indicating whether or not recording to the recording medium is allowable, that controls to record into the recording medium at a predetermined timing, when the flag indicates a record-allowable state, time information representing CM-broadcast periods determined, among those detected by the CM-broadcast-period detecting unit, to be continuous by the CM-broadcast-period-continuity determining unit and that makes the flag indicate a unallowable state for a predetermined time after recording to the recording medium;
    a CM-broadcast-period-information selecting and unifying unit that selects plural information of the CM-broadcast-periods from among those stored in the CM-broadcast-period-information-recording controlling unit, and unifies the plural information to provide information of another CM-broadcast-period to be recorded; and
    an information recording unit that records into the recording medium, the time information representing the another CM-broadcast period outputted from the CM-broadcast-period-information-recording controlling unit.

2. The audio-video recording device according to claim 1, wherein if, in a video-recorded television broadcast, an end time of the latest CM-broadcast period in the CM-broadcast periods determined to be continuous, is within a predetermined time range from an end time of the video-recorded broadcast, the CM-broadcast-period-continuity determining unit unifies information of an interval between these end times within the time range and that of the CM periods determined to be continuous.

3. An audio-video recording device that records a video signal and an audio signal of television broadcast into a recording medium, comprising:
    a transition-point detecting unit that detects, from the video signal or the audio signal of the television broadcast, its transition points;
    a CM-broadcast-period detecting unit that detects transition points that occur corresponding, with a predetermined tolerance, to a time interval specific to a CM broadcast, to thereby recognize a period defined by the thus detected transition points as a CM-broadcast period;
    a CM-broadcast-period-continuity determining unit that determines whether or not the CM-broadcast period detected by the CM-broadcast detecting unit is continuous with one previously detected;
    a CM-broadcast-period-information-recording controlling unit that sets an output priority for time information representing CM-broadcast periods determined, among those detected by the CM-broadcast-period detecting unit, to be continuous by the CM-broadcast-period-continuity determining unit, that stores a record flag which indicates whether or not the time information representing the CM-broadcast periods has already been recorded in the recording medium, and that controls to record into the recording medium at a predetermined timing, the time information that is not recorded , and has the highest output priority;
    a CM-broadcast-period-information selecting and unifying unit that selects plural information of the CM-broadcast-periods from among those stored in the CM-broadcast-period-information-recording controlling unit, and unifies the plural information to provide information of another CM-broadcast-period to be recorded; and
    an information recording unit that records into the recording medium, the time information representing the another CM-broadcast period outputted from the CM-broadcast-period-information-recording controlling unit.

4. The audio-video recording device according to claim 3, wherein the CM-broadcast-period-information selecting and unifying unit selects and unifies, among the plurality of CM-broadcast-period information stored in the CM-broadcast-period-information-recording controlling unit, a plurality of CM-broadcast-period information having the same output priority and the same record flag.

5. The audio-video recording device according to claim 3, wherein the CM-broadcast-period-information-recording controlling unit includes a record allowability flag indicating whether or not recording to the recording medium is allowable, and makes the flag indicate a unallowable state for a predetermined time after recording to the recording medium.

6. The audio-video recording device according to claim 3, wherein if, in a video-recorded television broadcast, an end time of the latest CM-broadcast period in the CM-broadcast periods determined to be continuous, is within a predetermined time range from an end time of the video-recorded broadcast, the CM-broadcast-period-continuity determining unit unifies information of an interval between these end times within the time range and that of the CM periods determined to be continuous.

* * * * *